US012798967B2

(12) United States Patent
Alotaibi et al.

(10) Patent No.: US 12,798,967 B2
(45) Date of Patent: Nov. 17, 2026

(54) SULFUR RECOVERY UNIT TO CONVERT HYDROGEN SULFIDE TO ELEMENTAL SULFUR

(71) Applicant: Saudi Arabian Oil Company, Dhahran (SA)

(72) Inventors: Bader Inad Alotaibi, Jubail (SA); Abdullah Alarifi, Dhahran (SA); Ahmad Almousa, Al Qatif (SA); Abdullah Alhumaid, Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 576 days.

(21) Appl. No.: 18/321,437

(22) Filed: May 22, 2023

(65) Prior Publication Data

US 2024/0391771 A1 Nov. 28, 2024

(51) Int. Cl.
*C01B 17/04* (2006.01)

(52) U.S. Cl.
CPC ...... *C01B 17/0434* (2013.01); *C01B 17/0421* (2013.01); *C01B 17/0456* (2013.01)

(58) Field of Classification Search
CPC ............ C01B 17/0434; C01B 17/0421; C01B 17/0456
See application file for complete search history.

(56) References Cited

U.S. PATENT DOCUMENTS

| | | | | |
|---|---|---|---|---|
| 4,857,297 | A | 8/1989 | Ketter et al. | |
| 9,023,309 | B1 | 5/2015 | Rameshni et al. | |
| 2013/0303811 | A1* | 11/2013 | Roisin | C10K 1/34 585/251 |
| 2022/0177307 | A1* | 6/2022 | Thellefsen | C01B 17/0456 |

FOREIGN PATENT DOCUMENTS

| | | | | |
|---|---|---|---|---|
| CN | 108499573 | | 7/2021 | |
| EP | 1442781 | | 8/2004 | |
| EP | 1442781 | A1 * | 8/2004 | B01D 53/8615 |
| EP | 1902769 | | 3/2008 | |
| WO | WO 2008035972 | | 3/2008 | |

OTHER PUBLICATIONS en.wikipedia.org [online], "Claus process," Available on or before Dec 15, 2005, via Internet Archive: Wayback Machine URL <https://web.archive.org/web/20051215000000/https://en.wikipedia.org/wiki/Claus_process>, retrieved on Apr. 1, 2023, URL <https://en.wikipedia.org/wiki/Claus_process>, 6 pages.

(Continued)

*Primary Examiner* — Claire X Wang
*Assistant Examiner* — Alyssa Lee Kuykendall
(74) *Attorney, Agent, or Firm* — Dinsmore & Shohl LLP

(57) ABSTRACT

A sulfur recovery unit (SRU) and method including converting hydrogen sulfide to elemental sulfur via the SRU having a reaction furnace and three catalytic reactors including a first catalytic reactor, a second catalytic reactor, and a third catalytic reactor disposed operationally in series, wherein catalyst in the first catalytic reactor consists of alumina catalyst, and wherein catalyst in the second catalytic reactor consists of a first layer of alumina catalyst, a second layer of hydrogenation catalyst, and a third layer of titania catalyst.

7 Claims, 4 Drawing Sheets

(56) References Cited

OTHER PUBLICATIONS

Gupta et al., “Advances in sulfur chemistry for treatment of acid gases,” Progress in Energy and Combustion Science, May 2016, 54:65-92, 28 pages.
Khairulin et al., “Direct Selective Oxidation of Hydrogen Sulfide: Laboratory, Pilot and Industrial Tests,” Catalysts, Sep. 15, 2021, 11(1109):1-45, 45 pages.
product.statnano.com [online], “Titania Catalyst,” Available on or before Dec 5, 2020, via Internet Archive: Wayback Machine URL <https://web.archive.org/web/20201205083149/https://product.statnano.com/product/11754/titania-catalyst>, retrieved on Apr. 1, 2023, URL <https://product.statnano.com/product/11754/titania-catalyst>, 2 pages.
Sadighi et al., “Modeling, Evaluating and Scaling up a Commercial Multilayer Claus Converter Based on Bench Scale Experiments,” Bulletin of Chemical Reaction Engineering & Catalysis, Available online Jul. 30, 2020, 15(2):465-475, 11 pages.
Zagoruiko et al., “Catalytic Processes and Catalysts for Production of Elemental Sulfur from Sulfur Containing Gases,” Catalysis in Industry, Dec 2010, 2(4):343-352, 10 pages.

* cited by examiner

100

200

300

400

SULFUR RECOVERY UNIT TO CONVERT HYDROGEN SULFIDE TO ELEMENTAL SULFUR

TECHNICAL FIELD

This disclosure relates to catalyst configurations of catalytic reactor converters in a sulfur recovery unit.

BACKGROUND

Hydrogen sulfide can be a byproduct of processing natural gas and refining sulfur-containing crude oils. Other industrial sources of hydrogen sulfide may include pulp and paper manufacturing, chemical production, waste disposal, and so forth. In certain instances, hydrogen sulfide can be considered a precursor to elemental sulfur.

Sulfur recovery may refer to conversion of hydrogen sulfide ($H_2S$) to elemental sulfur, such as in a sulfur recovery unit (SRU), e.g., Claus system. The most prevalent technique of sulfur recovery is the Claus system, which may be labeled as the Claus process, Claus plant, Claus unit, and the like. The Claus system includes a thermal reactor (e.g., a furnace) and multiple catalytic reactors to convert $H_2S$ into elemental sulfur.

A conventional Claus system can recover (convert) between 95% and 99% of $H_2S$. The percent recovery may depend on the number of Claus catalytic reactors. The tail gas from the Claus system may have the remaining (residual) $H_2S$, such as 1% to 5% of the equivalent $H_2S$ in the feed gas.

SUMMARY

An aspect relates to a method of operating a sulfur recovery unit (SRU), including feeding acid gas having hydrogen sulfide to a reaction furnace of the SRU, wherein the SRU has a thermal stage having the reaction furnace and a catalytic section having catalytic stages consisting of only three catalytic stages. The method includes converting, via the SRU, the hydrogen sulfide into elemental sulfur and recovering the elemental sulfur, wherein converting the hydrogen sulfide into elemental sulfur via the SRU includes converting the hydrogen sulfide into elemental sulfur in the reaction furnace and in the catalytic stages, wherein the catalytic stages include catalytic reactors consisting of a first catalytic reactor, a second catalytic reactor, and a third catalytic reactor disposed operationally in series, wherein catalyst in the first catalytic reactor consists of alumina catalyst, and wherein catalyst in the second catalytic reactor consists of a first layer of alumina catalyst, a second layer of hydrogenation catalyst, and a third layer of titania catalyst.

Another aspect is a method of operating an SRU including feeding acid gas including hydrogen sulfide to a reaction furnace of the SRU, wherein the SRU has a thermal section having the reaction furnace and a catalytic section having catalytic reactors consisting of a first catalytic reactor, a second catalytic reactor, and a third catalytic reactor operationally disposed in series, wherein the thermal section discharges hydrogen sulfide and sulfur dioxide to the catalytic section, wherein catalyst in the first catalytic reactor consists of alumina catalyst, and wherein catalyst in the second catalytic reactor consists of a first layer of catalyst that is alumina catalyst, a second layer of catalyst that is hydrogenation catalyst, and a third layer of catalyst that is titania catalyst. The method includes converting, via the SRU, the hydrogen sulfide into elemental sulfur and recovering the elemental sulfur, wherein the hydrogen sulfide is converted into elemental sulfur in both the reaction furnace and the catalytic section.

Yet another aspect relates to an SRU including a thermal section having a reaction furnace to receive feed including hydrogen sulfide and perform an oxidation reaction that converts hydrogen sulfide into sulfur dioxide and a Claus reaction that converts hydrogen sulfide and sulfur dioxide into elemental sulfur. The SRU includes a catalytic section to receive hydrogen sulfide and sulfur dioxide from the thermal section and perform the Claus reaction, wherein the catalytic section has catalytic stages consisting of a first catalytic stage, a second catalytic stage, and a third catalytic stage disposed operationally in series, wherein the first catalytic stage includes a first catalytic reactor to directly receive the hydrogen sulfide and sulfur dioxide from the thermal section and having catalyst consisting of alumina catalyst to perform the Claus reaction, wherein the second catalytic stage includes a second catalytic reactor having catalyst consisting of a first layer of alumina catalyst, a second layer of hydrogenation catalyst, and a third layer of titania catalyst disposed operationally in series.

The details of one or more implementations are set forth in the accompanying drawings and the description below. Other features and advantages will be apparent from the description and drawings, and from the claims.

BRIEF DESCRIPTION OF DRAWINGS

Like reference numbers and designations in the various drawings indicate like elements.

DETAILED DESCRIPTION

Some aspects of the present disclosure are directed to the first two catalytic reactors (converters) in a catalytic section of a sulfur recovery unit (SRU). The catalyst employed in the first catalytic reactor is alumina catalyst with no other catalyst. The catalyst employed in the second catalytic reactor is three catalysts that are alumina catalyst, titanium dioxide (titania) catalyst, and hydrogenation catalyst. Beneficially, not employing titania catalyst in the first catalytic reactor but instead increasing the amount of alumina catalyst in the first reactor can save catalyst costs for the SRU because alumina catalyst is less expensive than titania catalyst.

Embodiments of the present techniques are directed to the SRU as a Claus system that performs sulfur recovery from feed (e.g., acid gas) having hydrogen sulfide ($H_2S$). In implementations, the $H_2S$ may be a component of acid gas in the feed, and in which $H_2S$ can be less than 50% (volume or weight) of the acid gas or feed. In implementations, the sulfur compounds in the feed may be primarily $H_2S$. The SRU converts $H_2S$ to elemental sulfur, and condenses and recovers elemental sulfur.

Embodiments are directed to an SRU having a thermal stage (with reaction furnace) that receives acid gas including $H_2S$. The SRU further includes a catalytic section having three catalytic stages. Each catalytic stage includes a catalytic reactor also called a converter. Again, the SRU converts the $H_2S$ into elemental sulfur and recovers the elemental sulfur. In particular, both the thermal section (including reaction furnace and condenser) and the catalytic section convert $H_2S$ into elemental sulfur and recover the elemental sulfur.

The sulfur recovery industry has utilized the Claus reaction (gas phase reactions) as the basis for recovering elemental sulfur from $H_2S$ since at least the 1940s. The Claus plant, which is the long-standing workhorse of the industry, uses this chemistry to achieve approximately 95 to 99 percent recovery of the $H_2S$ in the acid gas feed as elemental sulfur (gas phase) which is subsequently condensed (changed from gas to liquid) and recovered in the liquid form.

The majority of Claus plants in operation worldwide include a thermal stage (e.g., a free-flame reaction furnace, waste heat boiler, and condenser) followed by either 2 or 3 catalytic stages (e.g., each catalytic stage including a reheater heat exchanger, a catalytic reactor as reactor vessel having a catalytic bed, and a condenser heat exchanger) that give practicable recovery efficiencies of about 94%-97% for a 2-stage design (two catalytic stages), or about 96%-99% for a 3-stage design (three catalytic stages).

Figure 1:
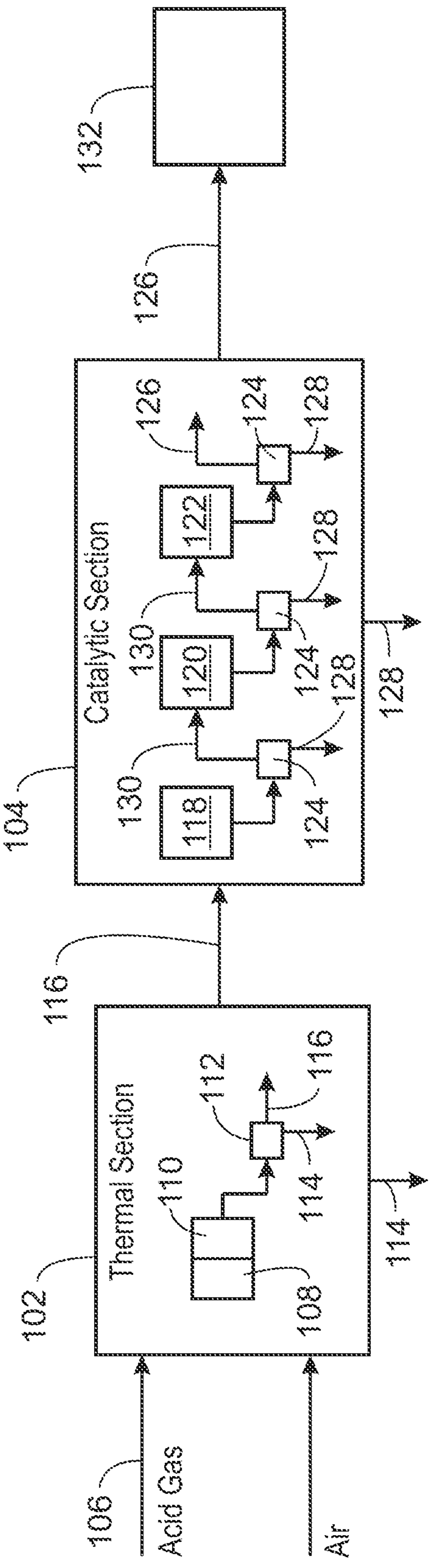
FIG. 1 is a diagram of a sulfur recovery unit (SRU) that converts hydrogen sulfide into elemental sulfur.

FIG. 1 is an SRU 100 that converts $H_2S$ into elemental sulfur. Sulfur recovery may refer to the conversion of $H_2S$ to elemental sulfur(S), and in which the elemental sulfur is recovered. The SRU 100 may be utilized to avoid combusting the full amount of the $H_2S$ in the feed 106 in a flare or thermal oxidizer (without sulfur recovery) that could give a significant amount of sulfur dioxide ($SO_2$) emissions to the environment. In the present context, $SO_2$ can be a product of $H_2S$ combustion.

To convert $H_2S$ into elemental sulfur and recover the elemental sulfur, the SRU 100 (Claus system) has a thermal section 102 (thermal stage) that converts some of the $H_2S$ into elemental sulfur and a catalytic section 104 (having three catalytic stages) that converts some of the $H_2S$ into elemental sulfur. The thermal section 102 and the catalytic section 104 may each condense elemental sulfur for recovery. The recovered elemental sulfur as liquid (not gas) may generally be above the melting point (e.g., 115° C.) of elemental sulfur.

The SRU 100 receives feed 106 having $H_2S$. The feed 106 may be or include acid gas having $H_2S$. The acid gas may also include carbon dioxide. The feed 106 (e.g., acid gas including $H_2S$) is provided (fed) to a reaction furnace 108 of the thermal section 102. Air is also fed to the reaction furnace 106 for the combustion in the reaction furnace 108.

The thermal section 102 further includes a waste heat boiler (WHB) 110 and a condenser heat exchanger 112 (e.g., shell-and-tube heat exchanger). The reaction furnace 108 (thermal reactor) may discharge furnace gas (furnace exhaust gas) through the WHB 110 that recovers heat from the furnace gas to vaporize water (e.g., boiler feedwater) into steam. The furnace gas discharged from the reaction furnace 108 is a combustion product of the reaction furnace 108, and may include $H_2S$, $SO_2$, and elemental sulfur.

The furnace gas flows from the WHB 110 through the condenser heat exchanger 112 to the catalytic section 104. The condenser heat exchanger 112 (e.g., utilizing water as cooling medium) may condense elemental sulfur gas in the furnace gas into liquid elemental sulfur 114 (molten sulfur) for removal and recovery.

A process stream 116 (process gas) including $H_2S$ and $SO_2$ discharges from the condenser heat exchanger 112 to the catalytic section 104. In other words, the furnace gas minus the elemental sulfur 114 condensed and removed via the heat exchanger 112 may flow as the process stream 116 (gas) to the first catalytic reactor 118. In implementations, the process stream 116 may flow through a reheater heat exchanger (not shown) of the catalytic section 104 before entering first catalytic reactor 118.

The catalytic section 104 includes three catalytic stages operationally in series. Each catalytic stage includes a catalytic reactor 118, 120, or 122 and a condenser heat exchanger 124 (e.g., shell-and-tube heat exchanger). In a given catalytic stage, the catalytic reactor discharges to the condenser heat exchanger 124 of that catalytic stage. Each catalytic reactor (e.g., Claus reactor) (also called catalytic converter or Claus catalytic converter) is a reactor vessel having a catalyst bed (e.g., Claus catalyst).

In implementations, the catalyst in the first catalytic reactor 118 consists solely of alumina catalyst. The alumina [aluminum (III) oxide] catalyst is typically activated alumina catalyst. The first catalytic reactor 118 is the first catalytic reactor in the operational series of the catalytic reactors 118, 120, 122. The first catalytic reactor 118 receives the process stream 116 from the thermal section 102. A catalytic reactor is not disposed operationally between the thermal section 102 and the first catalytic reactor 118.

In implementations, the catalyst in the second catalytic reactor 120 consists of alumina catalyst, hydrogenation catalyst, and titania [titanium dioxide also known as titanium (IV) oxide] catalyst. In implementations, the catalyst in the second catalytic reactor 120 consists of three layers of catalyst: [1] a first layer (inlet layer) of alumina catalyst; [2] a second layer (middle layer) of hydrogenation catalyst; and [3] a third layer (outlet layer) of titania catalyst. The hydrogenation catalyst provides for (promotes) the conversion of $SO_2$ back into $H_2S$. The second catalytic reactor 120 is the second catalytic reactor in the operational series of the catalytic reactors 118, 120, 122. The second catalytic reactor 120 receives the process stream 130 from the first catalytic stage. A catalytic reactor is not disposed operationally between the first catalytic stage and the second catalytic reactor 120.

In implementations, each catalytic stage may have a reheater (not shown), as would be appreciated by one of ordinary skill in the art. The final catalytic stage (third catalytic stage) in the operational series may include a coalescer (not shown) to remove moisture from the tail gas 126. In implementations, the third catalytic reactor 122 (in the final catalytic stage) in the operational series is a SuperClaus reactor.

The condenser heat exchanger 124 (e.g., with water as cooling medium) condenses elemental sulfur gas (in the process stream discharged from the respective reactor vessel 118, 120, or 122) into liquid elemental sulfur 128 (molten sulfur) for removal and recovery of the elemental sulfur as liquid. The process stream 130 (gas) discharged from the respective condenser heat exchanger 124 (which is the process stream discharge from the reactor of that stage minus elemental sulfur 128 condensed and removed via the heat exchanger 124) may flow to the next reactor vessel 120 or 122 in the series, except if the process stream is discharged from the final condenser heat exchanger 124 in which the process stream discharges as the tail gas 126 (having residual sulfur compounds) from the catalytic section 104. The process streams 130 and the tail gas 126 may include $H_2S$ and $SO_2$. In implementations, the tail gas 126 may have generally less than 5 volume percent (vol %) (e.g., in a range of 1 vol % to 5 vol %) of sulfur compounds, or less than 5 vol % (e.g., in a range of 1 vol % to 5 vol %) of the combined amount of $H_2S$ and $SO_2$.

In implementations with the catalytic section 104 having three catalytic stages (and thus three catalytic reactors 118, 120, 122), the sulfur recovery efficiency of the SRU 100 may be, for example, in the range of 95% to 99%. In implementations with the catalytic section 104 having three catalytic stages (and thus the three catalytic reactors 118, 120, 122) and with the third (final) catalytic stage being a SuperClaus stage (and thus with the third catalytic reactor 122 as a SuperClaus reactor), the sulfur recovery efficiency of the SRU may be, for example at least 98.6%, in a range of 98.6% to 99.2%.

The percent recovery efficiency of sulfur recovery may refer to the percent of $H_2S$ converted and removed from the feed 106 or refer to the percent of sulfur compounds (including $H_2S$) converted and removed from the feed 106. The basis may be total sulfur compounds in the feed 106 expressed in terms of equivalent S1 (S1 meaning sulfur compounds with one sulfur atom in a molecule).

The tail gas 130 may flow to a processing system 132, such as a thermal oxidizer for incineration of the tail gas 126 (as the processing). The processing system 132 may be a flare, thermal oxidizer, or tail gas treatment (TGT) unit, and the like.

In the example of a catalytic section 104 having three catalytic stages, the SRU 100 may have at least four heat exchangers that condense elemental sulfur for removal: [a] thermal-stage heat exchanger 120 (condenser #1) and [b] three catalytic-section heat exchangers 124 (condenser #2, condenser #3, and condenser #4). For condensing the elemental sulfur, the condenser heat exchangers 112, 124 may cool the process stream having the elemental sulfur, for example, to in the range of 150° C. to 300° C.

The SRU 100 (including the thermal section 102 and the catalytic section 104) converts $H_2S$ into elemental sulfur for removal and recovery of the elemental sulfur 114, 128. In certain implementations, the liquid elemental sulfur 114, 128 may be forwarded to downstream handling or processing, such as a sulfur handling unit. In some implementations, the liquid elemental sulfur 114, 128 (molten sulfur) may be collected, for example, in a sulfur pit before being sent to the sulfur handling unit.

As known by one of ordinary skill in the art, the sulfur pit in the present context is a sulfur receiver, which can include a receptacle, container, or vessel, and so on. The sulfur receiver or sulfur pit may be a storage vessel in which liquid sulfur is accumulated and stored. A sulfur pit may temporarily accommodate elemental sulfur(S) extracted from an SRU or similar system, and in which the elemental sulfur may then be conveyed from the sulfur pit for further processing or to transportation systems, and the like.

In implementations, each catalytic stage may have a reheater heat exchanger that heats the process stream 116, 130 entering the catalytic reactor 118, 120, 122 of that catalytic stage. The reheater may facilitate control of catalyst bed temperature in the reactor 118, 120, 122. The reheater may be, for example, an indirect steam reheater (e.g., shell-and tube heat exchanger) in which the process stream (gas) is heated with steam as heating medium. The reheater may be, for example, a fired-reheater (e.g., direct-fired heater) (e.g., a burner) that burns fuel gas or acid gas to heat the process stream.

An oxidation reaction in the thermal stage in the reaction furnace 108 (thermal reactor) is $2H_2S+3O_2 \rightarrow 2SO_2+2H_2O$, which is the oxidation of the entering $H_2S$ from the feed 106 (e.g., acid gas) with oxygen ($O_2$) gas (e.g., from the added air) to give $SO_2$ and water ($H_2O$) vapor. The reaction furnace 108 as a thermal reactor may also perform the Claus reaction $2H_2S+SO_2 \rightarrow 3S+2H_2O$, in which $H_2S$ gas and $SO_2$ react to give elemental sulfur(S) gas and water vapor. An overall reaction for the SRU 100 (e.g., Claus system) involving these two reactions (oxidation reaction and Claus reaction) may be characterized as $2H_2S+O_2 \rightarrow 2S+2H_2O$.

The Claus reaction $2H_2S+SO_2 \rightarrow 3S+2H_2O$ may also be performed (as a catalytic reaction) in the catalytic reactors 118, 120 having catalyst (catalyst bed) for performing the Claus reaction. The catalyst is employed to convert the $H_2S$ and sulfur dioxide ($SO_2$) to sulfur. The catalyst (e.g., Claus catalyst) may include activated alumina catalyst and/or titania catalyst, as discussed. Other Claus catalysts are applicable. In implementations, as mentioned, the catalyst in the first catalytic reactor 118 consists solely of alumina catalyst, and the catalyst in the second catalytic reactor 120 consists of a first layer (inlet layer) of alumina catalyst, a second layer (middle layer) of hydrogenation catalyst (e.g., a EuroClaus® catalyst), and a third layer (outlet layer of titania catalyst). See, for example, the "after" configuration in FIG. 2.

In implementations, the final catalytic reactor 122 (third reactor 122) in the series is a SuperClaus reactor having catalyst (that may be labeled as SuperClaus catalyst) selective for direct oxidation of $H_2S$. This SuperClaus catalyst may include, for example, an alumina support with iron and chromium oxides as active catalytic material. The SuperClaus direct oxidation of $H_2S$ (e.g., in the final reactor 122) may be represented by the aforementioned overall equation $2H_2S+O_2 \rightarrow 2S+2H_2O$. In implementations with the final (third) reactor 122 in the series as a SuperClaus reactor, air may be provided to the final reactor 122 to promote the direct oxidation of the $H_2S$. In embodiments, the catalytic section 104 has three catalytic reactors in which the first two catalytic reactors 118, 120 disposed operationally in the series are each a Claus reactor, and the third (and final) catalytic reactor 122 disposed operationally in the series is a SuperClaus reactor.

Embodiments herein of the SRU 100 as a Claus system (that converts $H_2S$ into sulfur and recovers the sulfur) includes the thermal stage (thermal section 102) as an initial stage and having the reaction furnace 108, waste heat boiler 110, and condenser heat exchanger 112. In addition, this Claus system downstream of the thermal stage includes two Claus catalytic reactors 118, 120. A Claus catalytic reactor is defined herein as a reactor having catalyst that performs the Claus reaction. The catalyst in Claus reactors may be Claus catalyst, which is defined as catalyst that performs, advances, or promotes the Claus reaction. A Claus catalytic reactor 118, 120 may be a reactor vessel having the Claus catalyst inside (in the inner volume of) the reactor vessel. The catalyst may be a bed (e.g., fixed bed) of catalyst. Again, the third catalytic reactor 122 is a SuperClaus catalytic reactor.

In implementations, the SRU tail gas 126 discharges to a thermal oxidizer (or other incineration or combustion system) as the downstream processing system 132. The thermal oxidizer may also be labeled as a thermal incinerator. A thermal oxidizer may decompose and combust gas at high temperature. Thermal oxidizers may be a direct-fired thermal oxidizer, regenerative thermal oxidizer (RTO), catalytic oxidizer, and so on.

Various commercialized flue gas desulfurization (FGD) technologies are available to remove remaining $SO_2$ from the stack gas of the thermal oxidizer. In a particular present implementation, an FGD unit treats the combustion (incineration) components (flue gas) discharged from the thermal oxidizer to remove $SO_2$ so that the sulfur recovery efficiency associated with the present Claus system can be increased. The FGD may be, for instance, an $SO_2$ scrubbing unit including a scrubber tower (column) vessel. The scrubber tower may have, for example, internals to apply alkaline sorbent, spray nozzles for spraying absorbing or reacting fluid, plates or packed beds of packing for providing contact area between the flue gas and a treatment liquid, and so forth. The treatment of the thermal oxidizer flue gas may involve scrubbing the flue gas via the scrubbing tower with an alkali solid or solution.

In implementations, the tail gas 126 is not discharged to a TGT unit. Instead, the tail gas 126 is discharged to a thermal oxidizer for incarnation, as described. In these implementations, the downstream processing 132 does not include a TGT unit, and wherein the SRU 100 does not include a TGT unit or couple to a TGT unit.

In alternate implementations, the tail gas 126 may discharge to a TGT unit as the processing system 132. In certain implementations with the SRU 100 having a TGT unit and a catalytic section 104 with two or three catalytic stages (and thus two or three catalytic reactors 122), a 99.9+ percent sulfur recovery may be achieved. An example of a TGT unit is a unit employing reduction absorption amine-based technology. This technology employs the reduction and hydrolysis of sulfur compounds back to the form of $H_2S$, across a catalytic hydrogenation reactor vessel, prior to being processed in a low-pressure amine unit having a vessel. The $H_2S$ that is absorbed into the amine is then regenerated and sent back to the front end of the SRU 100 (Claus plant) as a recycle acid gas feed stream (for feed 106 to the reaction furnace 108).

A Claus system can recover, for example, between 95% and 99% of $H_2S$. The percent recovery may depend on the number of Claus catalytic reactors. The tail gas from the Claus system may have the remaining (residual) $H_2S$, such 1% to 5% of the equivalent $H_2S$ in the feed gas. The Claus tail gas can be treated to recover this remaining $H_2S$ equivalent. In particular, a tail gas treatment (TGT) unit, also known as TGTU, tail gas (TG) unit, and TGU, can increase sulfur recovery to or above 99.9%, but generally employs complex and expensive equipment. A TGT unit (e.g., amine-based TGT unit) can be complicated and energy-intensive. An amine-based TGT unit can include, for example, a refractory-coated reaction furnace and/or an air blower. Operating expenditures include requiring fuel gas and energy consumption with air blowers and their motors, and requiring regeneration and recirculation of amine in the TGT unit, and so on.

Figure 2:
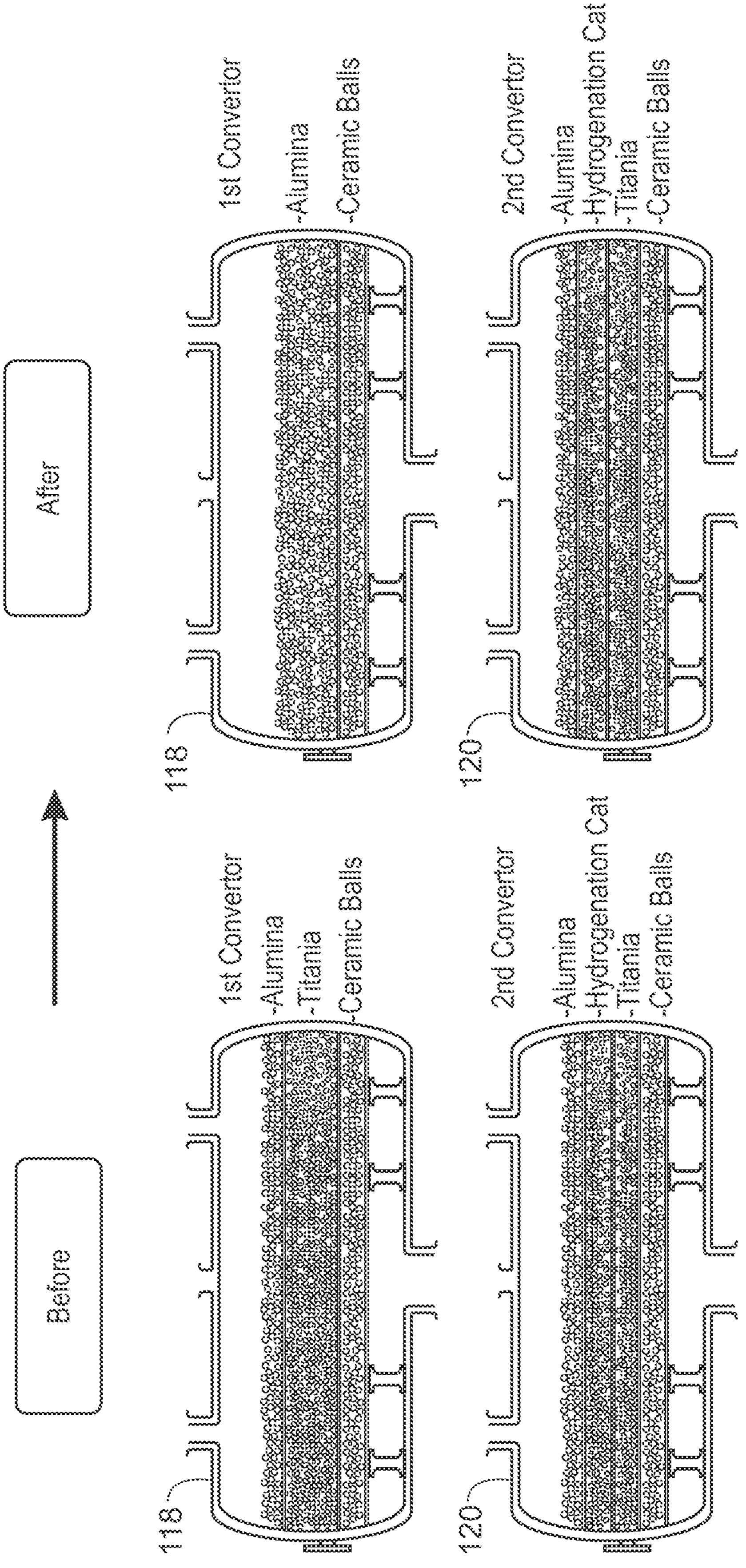
FIG. 2 is a diagram of reactor catalyst configurations of the first catalytic reactor (first converter) and the second catalytic reactor (second converter) of the SRU of FIG. 1.

FIG. 2 depicts reactor catalyst configurations 200 of the first catalytic reactor 118 (first converter) and the second catalytic reactor 120 (second converter) of the SRU 100 of FIG. 1. In these examples, the catalytic reactor 118, 120 vessels have a horizontal orientation. The top of the reactor vessel is the inlet side of the vessel. The bottom of the reactor vessel is the outlet side of the vessel.

The process stream 116 from the thermal section 102 (FIG. 1) enters the first reactor 118 vessel at the top of the first reactor vessel, giving a reaction mixture that flows downward through the first reactor 118 vessel and discharges from the bottom of the first reactor 118 vessel to the first condenser 124 (condenser #2 of FIG. 3) in the catalytic section 104 (FIG. 1). The process stream 130 from the first catalytic stage [from the first condenser 124] enters the second reactor 120 vessel at the top of the second reactor 120 vessel, giving a reaction mixture that flows downward through second reactor 120 vessel and discharges from the bottom of the second reactor 120 vessel to the second condenser 124 (condenser #3 of FIG. 3) in the catalytic section 104 (FIG. 1).

FIG. 2 on the left gives the first configuration (respective first configurations) of catalyst (e.g., labeled as "before") for the first catalytic reactor 118 and the second catalytic reactor 120. The first configuration ("before" on the left) is [a] the catalyst in the first catalytic reactor 118 consisting of a top layer (inlet layer) of alumina catalyst and a bottom layer (outlet layer) of titania catalyst, and [b] the catalyst in the second catalytic reactor 120 consisting of a top layer (inlet layer) of the alumina catalyst, a middle layer of hydrogenation catalyst, and a bottom layer (outlet layer) of the titania catalyst. The hydrogenation catalyst may be, for example, cobalt-molybdenum (Co—Mo) on an aluminum oxide ($A_2O_3$) [aluminum (III) oxide] support. The middle layer of hydrogenation catalyst is disposed between the top layer of alumina catalyst and the bottom layer of titania catalyst. Below the catalysts in the "before" configuration (and in the "after" configuration) are ceramic balls (e.g., 0.24 inch in diameter) (not catalyst), as depicted.

In certain implementations for the "before" configuration, the alumina catalyst in the first reactor 118 is in the range of 35 vol % to 55 vol % of the loaded catalyst in the first reactor 118, the alumina catalyst in the second reactor 120 is in the range of 55 vol % to 75 vol % of the loaded catalyst in the second reactor 120, the titania catalyst in the first reactor 118 is in the range of 38 vol % to 58 vol % of the loaded catalyst in the first reactor 118, and the titania catalyst in the second reactor 120 is in the range of 10 vol % to 30 vol % of the loaded catalyst in the second reactor 120. In the Example of the Khursaniyah Gas Plant (KGP) in the Eastern Province of Saudi Arabia discussed below, for the "before" configuration, the alumina catalyst in the first reactor 118 is 44 vol % of the loaded catalyst in the first reactor 118, the alumina catalyst in the second reactor 120 is 64 vol % of the loaded catalyst in the second reactor 120, the titania catalyst in the first reactor 118 is 48 vol % of the loaded catalyst in the first reactor 118, and the titania catalyst in the second reactor 120 is 19 vol % of the loaded catalyst in the second reactor 120.

FIG. 2 on the right gives the second configuration (respective second configurations) of catalyst (e.g., labeled as "after") for the second catalytic reactor 118 and the second catalytic reactor 120. The second configuration ("after" on the right) is [a] the catalyst in the first catalytic reactor 118 consists of only alumina catalyst and [b] the catalyst in the second catalytic reactor 120 consists of a top layer (inlet layer) of the alumina catalyst, a middle layer of the hydrogenation catalyst, and a bottom layer (outlet layer) of the titania catalyst. The middle layer of the hydrogenation catalyst is disposed between the top layer of alumina catalyst and the bottom layer of titania catalyst. For the second catalytic reactor 120, the first configuration ("before") and the second configuration ("after") are the same, except the second configuration ("after") has more titania catalyst than the first configuration ("before) for the second catalytic reactor 120, and the amount of the alumina catalyst may decrease in the second catalytic reactor 120 in going from "before" to "after" such as to accommodate or account for the increase in the titania catalyst. The amount of the hydrogenation catalyst may remain unchanged in the second catalytic reactor 120 in going from "before" to "after."

The alumina catalyst is generally alumina as aluminum oxide ($Al_2O_3$) (or bauxite). The alumina may be a porous alumina. The alumina may be activated alumina that is porous and having an increased ratio of surface-area-toweight. An example of the alumina catalyst as porous alumina is alumina sulfur-recovery catalyst SulShine™ CR-3S available from Axens Group having headquarters in Rueil-Malmaison, France. SulShine™ CR-3S can be spherical $Al_2O_3$ beads having a diameter in the range of 3 millimeters (mm) to 6 mm.

Again, for the titania catalyst, the titania is generally titanium dioxide ($TiO_2$). An example of titania catalyst is SulShine™ CR-3S (available from Axens Group) that is promoted titania-based catalyst for sulfur recovery units. SulShine™ CR-3S catalyst is based on promoted pure titanium dioxide (titania), and is available as 3-4 mm diameter cylindrical extrudate.

The hydrogenation catalyst may be Co—Mo on an $Al_2O_3$ support. An example of such a catalyst as Co—Mo on an $Al_2O_3$ support is EuroClaus® hydrogenation catalyst KF756 available from Albemarle Corporation having headquarters in Charlotte, North Carolina, USA. In the second catalytic reactor 120, the hydrogenation catalyst is for the conversion (hydrogenation) of $SO_2$ into $H_2S$.

In some retrofits of the SRU in altering the "before" configuration to the "after" configuration, the amount of titania catalyst utilized in the SRU is reduced by in the range of 20% to 40% (reduced by about 33% in the KGP Example), and the amount of alumina catalyst utilized in the SRU in increased by in the range of 10% to 30% (increased by about 17% in the KGP Example). This results in a cost reduction of catalyst for the SRU, for example, in the range of 20% to 45% (cost reduction of SRU catalyst of up to 41% in the Example of the Khursaniyah Gas Plant (KGP) in the Eastern Province of Saudi Arabia). Advantageously, the cost reduction of catalyst for the SRU of up to 41% with the retrofit does not significantly affect other operating costs or the sulfur recovery. The Khursaniyah Gas Plant (KGP) is owned by Saudi Aramco (or simply Aramco), officially the Saudi Arabian Oil Group, having headquarters in Dhahran, Saudi Arabia.

As indicated, the titania catalyst is more expensive than the alumina catalyst, such as with a basis of cost per mass (weight) or cost per volume. In examples, the amount of the alumina catalyst increases in the first reactor 118 in going from before to after by about 52%. This amount may be based on an adequate amount of alumina catalyst (as the only catalyst in the first reactor 118) in acting as the Claus catalyst converting $H_2S$ directly to elemental sulfur to give the desired sulfur recovery of the SRU. With the removal of titania from the first reactor 118 in going from before to after, this leaves hydrolysis of carbonyl sulfide (COS) and carbon disulfide ($CS_2$) for the titania in the in the second reactor 120. In examples for the retrofit of before to after, the titania in the second reactor 120 increases by about 53%, but this amount titania added to the second reactor 120 in the increase is less than the titania removed from the first reactor 118 in going from before to after. By having titania in only the second reactor 120 and not the first reactor 118 allows for less titania utilized in the first reactor 118 and the second reactor 120 collectively of the before configuration to give the desired sulfur recovery of the SRU.

In the "before" configuration (first configuration), the process gas from the furnace is introduced to the first catalytic reactor 118 having the two types of catalyst in a first layer and a second layer, respectively. The first layer (top layer, inlet layer) is activated alumina catalyst that accelerates the Claus reaction of conversion between $H_2S$ and $SO_2$ to elemental sulfur, that follows the chemical equation $2H_2S+SO_2 \rightarrow 3S+2H_2O$ (Claus reaction). In this "before" configuration (first configuration), the second layer (bottom layer, outlet layer) of the first catalytic reactor 118 is titania catalyst that operates on reversing side reactions (undesired reactions) in the furnace that give the undesired products COS and $CS_2$. The titania catalyst may beneficially promote conversion (hydrolysis) of COS and $CS_2$ to $H_2S$, such as via the reactions or chemical equations $COS+H_2O \rightarrow CO_2+H_2S$ and $CS_2+2H_2O \rightarrow CO_2+2H_2S$.

The second catalytic reactor 120 has alumina catalyst and titania catalyst, and additionally has the hydrogenation catalyst. The second catalytic reactor 120 has a first layer (top layer, inlet layer) of the activated alumina catalyst that promotes the Claus reaction of $H_2S$ and $SO_2$ to elemental sulfur. As indicated, the Claus reaction is $2H_2S+SO_2 \rightarrow 3S+2H_2O$. The second catalytic reactor 120 has a second layer (middle layer) of the hydrogenation catalyst, and a third layer (bottom layer, outlet layer) of the titania catalyst. As mentioned, the titania catalyst may convert side products COS and $CS_2$ into $H_2S$. The side products COS and $CS_2$ can be generated in (resulting from) reactions in the furnace and in the above hydrogenation catalyst layer in the second catalytic reactor 120.

To reduce titania catalyst usage by the SRU, the titania catalyst may be removed from (not included in) the first catalytic reactor 118, and thus with the first catalytic reactor 118 having only (solely relying on) alumina catalyst to perform the process reaction (Claus reaction). The amount of alumina catalyst in the first reactor 118 may be relatively slightly increased (e.g., by 17%) in this "after" configuration (second configuration). The amount of titania catalyst in the second reactor 120 may be increased (e.g., by 53%) in this "after" configuration (second configuration) to account for (accommodate) removal of the titania catalyst from the first reactor 118, or in other words, to account for titania catalyst not included in the first reactor 118. The increase in titania catalyst in the second reactor 120 is significantly less than the titania catalyst no longer in the first reactor 118. Again, this yields financial benefits because the titania catalyst is more expensive than the alumina catalyst. In the retrofit, removal of the titania catalyst from the first reactor 118 results in an increase in the amount of activated alumina catalyst in the first reactor and an increase in the amount of titania in the second reactor 120, but the entire layer of the titania catalyst eliminated from the first reactor 188 is substantial. The net outcome is a cost reduction in catalyst usage in a range of 20% to 45% for the SRU. In the "after" (second configuration), the catalyst loading of titania catalyst in the second reactor 120 and not the first reactor 118 means that the conversion of COS and $CS_2$ into $H_2S$ is one focus for the second reactor 120 and not the first reactor 118. This conversion via the titania catalyst in the second reactor 120 can be viewed as reversal reactions converting into $H_2S$ the undesired products COS and $CS_2$ generated in the reaction furnace and via the hydrogenation catalyst An embodiment is a method of retrofitting a catalytic section of an SRU (e.g., SRU 100 of FIG. 1) with respect to catalyst configuration in which the first catalytic reactor 118 and the second catalytic reactor 120 have the "before" configuration, as depicted respectively in FIG. 2, at initiation (time=0) of the retrofit, and have the "after" configuration (second configuration), as depicted respectively in FIG. 2, at the conclusion of the retrofit as a result of the retrofit. The retrofit can involve removing the titania catalyst from the first catalytic reactor 118 and increasing the amount of alumina catalyst in the first catalytic reactor 118. The retrofit can involve increasing the amount of titania catalyst in the second catalytic reactor 120, wherein the amount of titania catalyst increased in the second catalytic reactor is less than the titania catalyst removed from the first catalytic reactor.

Figure 3:
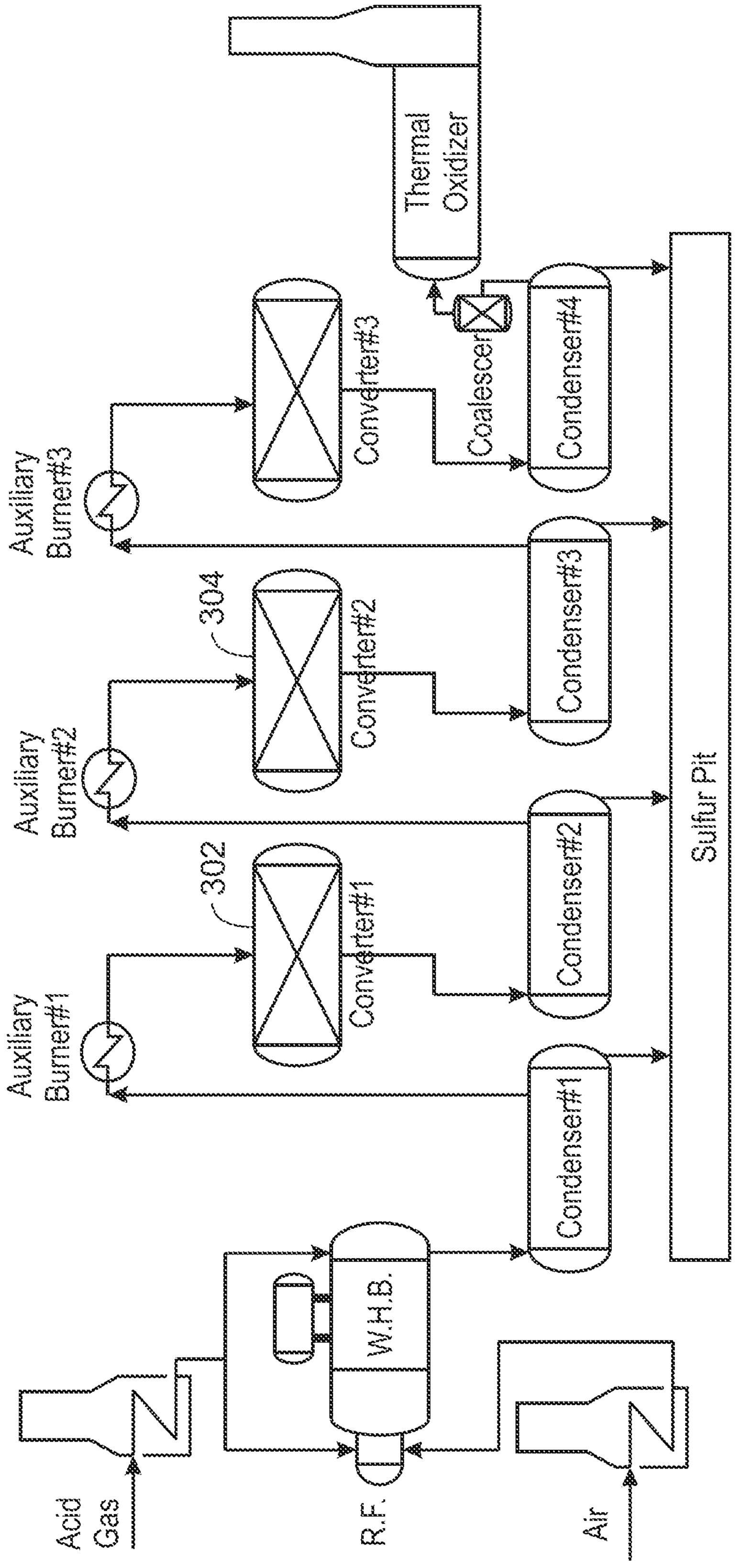
FIG. 3 is a diagram of an SRU that is analogous to the SRU of FIG. 1.

FIG. 3 is an SRU 300 that is analogous to the SRU 100 of FIG. 1. The SRU 300 is a Claus system and may be labeled as a SuperClaus system because the final (third) catalytic reactor (converter #3) is a SuperClaus reactor having SuperClaus catalyst. The SRU 300 converts $H_2S$ and recovers liquid elemental sulfur. The SRU 300 may have a design sulfur-recover efficiency of about 98.6%. The actual sulfur-recovery efficiency in operation may be, for example, in the range of 98% to 99%.

The WHB may be a combustion chamber with a steam drum on top of the vessel. The WHB may be a bundle of tubes immersed in boiler feed water. The steam drum is mounted on top of the furnace to have the tube bundle immersed at all times. Steam (e.g., saturated) is produced from the WHB. The steam may be less than 250 psig, or in the range of 200 psig to 300 psig.

A pretreatment stage may include an acid gas scrubber (not shown), acid gas knockout drum (not shown), acid gas preheater, and air preheater. The SRU 300 has a thermal stage followed by three catalytic stages.

Air may be heated (pre-heated) and fed to the reaction furnace (RF), such as to the furnace flame or combustion chamber. Acid gas (e.g., from an acid-gas removal system, such as an amine treating unit) is heated (pre-heated) and fed to the reaction furnace (RF), such as to the furnace flame or combustion chamber. A portion (e.g., 20% to 60%) of the acid gas is not burned in the furnace or combustion chamber but instead is fed downstream to mix with furnace gas (furnace exhaust as gas combustion products) at an exit part of the RF/WHB vessel.

The thermal stage includes the RF, WHB, and a condenser heat exchanger (condenser #1). In the thermal stage, less than ⅓ of the feed $H_2S$ is burned to $SO_2$. Elemental sulfur is produced in the RF and then condensed by the first condenser (condenser #1). Significant heat may be generated in the thermal stage, most of which is recovered in the WHB to produce steam [e.g., medium pressure (MP) (e.g., 250 psig) steam] that can be consumed, for example, within the SRU 300. The main chemical reactions in the thermal stage may include, for example, $2H_2S+3O_2 \rightarrow 2SO_2+2H_2O$; $6H_2S+3O_2 \rightarrow 3S_2+6H_2O$; and $4H_2S+2SO_2 \rightarrow 3S_2+4H_2O$.

The $SO_2$ generated in the RF and discharged from the RF reacts over the catalyst in the first two catalytic stages with $H_2S$ (not converted in the RF) to form elemental sulfur at significantly lower temperature than the RF temperature. The catalytic reaction in the first two catalytic stages (Claus stages) (in converter #1 302 and converter #2 304) includes $2H_2S+SO_2 \rightarrow (3/x)\ S_x+2H_2O$. The catalytic reaction in the third catalytic stage (SuperClaus stage) (in converter #3) includes $H_2S+(1/2)O_2 \rightarrow (1/x)\ S_x+H_2O$. The elemental sulfur product is removed from the process gas from the catalytic reactors (converter #1, converter #2, converter #3) in the condensers (condenser #1, condenser #2, condenser #3), respectively, by cooling and condensation.

The catalytic section includes three stages. The first two are Claus while the third stage is SuperClaus. Each stage has a re-heater to raise the process gas temperature above sulfur dew point, a catalytic reactor to produce elemental sulfur, and a condenser heat exchanger to condense and remove the elemental sulfur product. In the illustrated implementation, the re-heater is a fired heater that utilizes (burns) fuel to increase the temperature of the acid gas. The word "auxiliary" indicates the re-heater is utilized as supplementary equipment for the catalytic reactors (catalytic converters).

In embodiments, the convertor #1 or first catalytic stage reactor (first catalytic reactor 302) has catalyst that consists of only activated alumina catalyst. The first catalytic reactor 302 is analogous to the first catalytic reactor 118 of FIG. 1 and the first catalytic reactor 118 having the "after" catalyst configuration of FIG. 2. Convertor-2 (second catalytic reactor 304) has a top layer of catalyst that is an activated alumina catalyst bed, a middle layer of hydrogenation catalyst (e.g., Co—Mo on an $Al_2O_3$ support), and a bottom layer of titania catalyst [titanium oxide ($TiO_2$) material]. The titania catalyst advances hydrolysis of COS and $CS_2$. The second catalytic reactor 304 is analogous to the second catalytic reactor 120 of FIG. 1 and the second catalytic reactor 120 having the "after" catalyst configuration of FIG. 2.

The third convertor, convertor #3, e.g., analogous to the third catalytic reactor 122 of FIG. 1, has a SuperClaus catalyst where the catalytic reaction is oxidation of the remaining $H_2S$ directly to elemental sulfur. The third catalytic stage (having the converter #3 and condenser #4) discharges through a coalescer to a thermal oxidizer. The coalescer is a drum vessel that is relatively large with a demister pad at the outlet of the drum vessel. In operation, the coalescer (drum) collects any droplets of elemental sulfur not in condenser #4. The coalescer is located between condenser #4 and the thermal oxidizer.

As illustrated, elemental sulfur may be discharged from the depicted four condensers to a sulfur pit. This produced liquid elemental sulfur may be stored in a heated sulfur pit and transported from the sulfur pit to sulfur handling facilities to be distributed to users or exported to customers.

A sulfur pit can include a sulfur receptacle, container, or vessel, and so on. The sulfur receiver or sulfur pit may be a storage vessel in which sulfur that has been condensed is received, and accumulated and stored. A sulfur pit may temporarily accommodate elemental sulfur(S) extracted from an SRU or similar system and that may be conveyed for further processing or to transportation systems, and the like.

Figure 4:
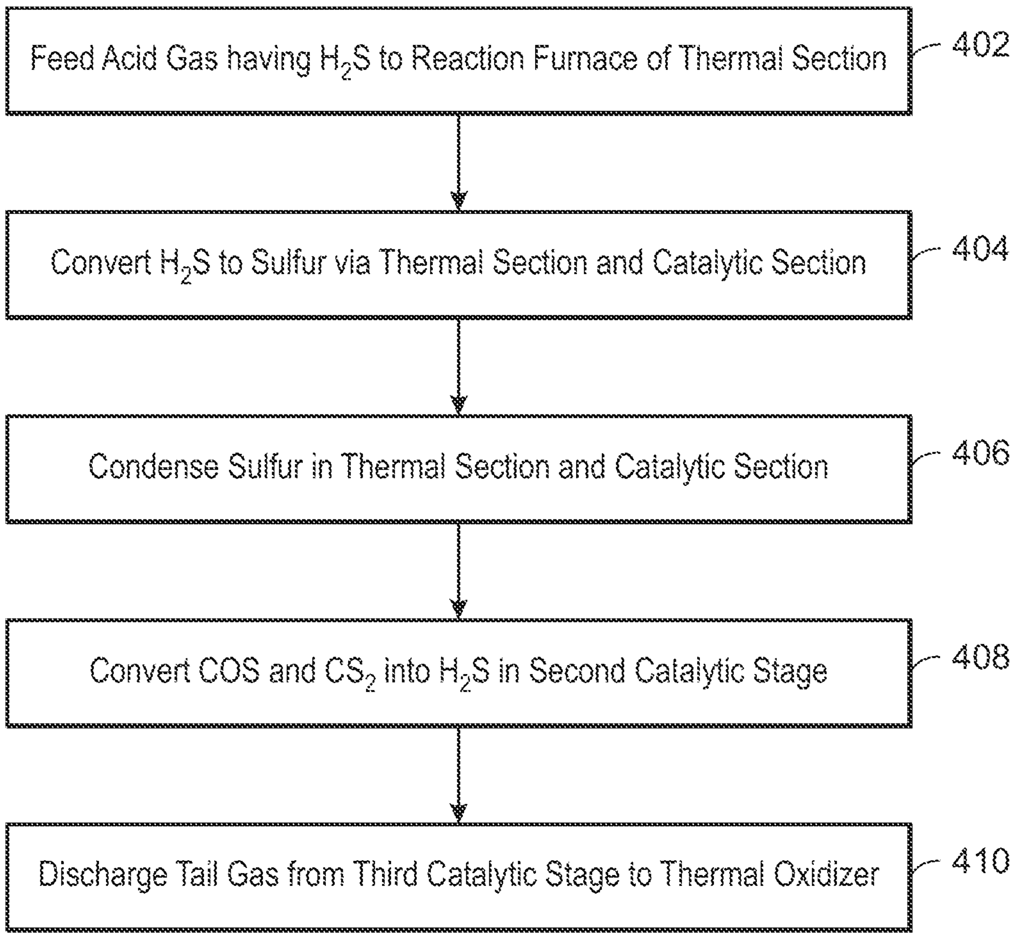
FIG. 4 is a block flow diagram of a method of operating an SRU.

FIG. 4 is a method 400 of operating an SRU. In implementations, the SRU is a Claus system having a thermal stage (thermal section) including a reaction furnace and a catalytic section having catalytic reactors.

At block 402, the method includes feeding acid gas including $H_2S$ to the reaction furnace of the SRU, wherein the SRU has the thermal stage having the reaction furnace and wherein the SRU has the catalytic section having catalytic stages consisting of three catalytic stages disposed operationally in series.

At block 404, the method includes converting, via the SRU, the $H_2S$ into elemental sulfur and recovering the elemental sulfur, wherein converting the $H_2S$ into elemental sulfur via the SRU includes converting the $H_2S$ into elemental sulfur in the reaction furnace and in the catalytic stages, wherein the catalytic stages include catalytic reactors consisting of the first catalytic reactor, a second catalytic reactor, and a third catalytic reactor disposed operationally in series.

Catalyst in the first catalytic reactor consists of alumina catalyst. Catalyst in the second catalytic reactor consists of a first layer of alumina catalyst, a second layer of hydrogenation catalyst (e.g., EuroClaus® catalyst, or Co—Mo on an $Al_2O_3$ support), and a third layer of titania catalyst. In implementations, the first layer of alumina catalyst is at an inlet portion of the second catalytic reactor, the third layer of titania catalyst is at an outlet portion of the second catalytic reactor, and the second layer of hydrogenation catalyst is disposed between the first layer of alumina catalyst and the third layer of titania catalyst.

In operation, the thermal stage (thermal section) discharges $H_2S$ and $SO_2$ to the catalytic section. In implementations, the first catalytic reactor directly receives the hydrogen sulfide and sulfur dioxide discharged from the thermal section (thermal stage). In other words, the first catalytic reactor receives furnace gas from the reaction furnace without elemental sulfur condensed and removed from the furnace gas via a condenser heat exchanger of the thermal section. In implementations, a catalytic reactor is not operationally disposed between the furnace or thermal section and the first catalytic reactor, wherein the thermal section does not comprise a catalytic reactor.

The first catalytic stage includes the first catalytic reactor. The second catalytic stage includes the second catalytic reactor. The third catalytic stage includes the third catalytic reactor. The first catalytic reactor, the catalytic reactor, and the third catalytic reactor are disposed operationally in series. In implementations, the first catalytic reactor is a catalytic reactor that is disposed first in operational position of catalytic reactors in the SRU. In implementations, the second catalytic reactor receives feed directly from the first catalytic stage of the three catalytic stages, wherein a catalytic reactor is not operationally disposed between the first catalytic reactor and the second catalytic reactor.

At block 406, the method includes condensing elemental sulfur in the thermal section and in the catalytic section. In implementations, the thermal section, the first catalytic stage, the second catalytic stage, and the third catalytic stage each have a condenser heat exchanger to condense elemental sulfur and discharge the elemental sulfur to a sulfur pit.

A sulfur pit may be a variety of different type of vessels. These vessels can be constructed of carbon steel or stainless steel, aluminum-alloy, or reinforced concrete, and the like. The vessels can be mobile, such as in marine barges, railroad train cars and tanker trucks. However, stationary vessels, such as above-grade insulated storage tanks, can be constructed of carbon or stainless steel and/or aluminum-alloy. Below-grade storage vessels may be implemented due to gravity flow considerations, are can be, for example, reinforced concrete pits or tanks. Two examples of below-grade sulfur pits include working pits (e.g., day pits or sumps with daily fluctuations in molten sulfur levels) and storage pits that maintain relatively consistent molten sulfur levels.

At block 408, the method includes converting COS and $CS_2$ into $H_2S$ in the second catalytic stage via the titania catalyst in the second catalytic reactor. The converting of $H_2S$ into elemental sulfur in the catalytic stages includes at least converting $H_2S$ into elemental sulfur via alumina catalyst in the first catalytic reactor and via alumina catalyst in the second catalytic reactor. The Claus reaction $2H_2S+SO_2\rightarrow 3S+2H_2O$ occurs with (promoted by) both the alumina catalyst and the titania catalyst. The alumina catalyst may be placed as the top layer of the second reactor as a sacrificial layer for any soot formation, as alumina catalyst is cheaper than titania catalyst and economically better to be changed periodically while the titania can live to its guaranteed lifecycle.

At block 410, the method includes discharging a process stream having hydrogen sulfide from the third and final catalytic stage of the three catalytic stages as tail gas of the SRU to a thermal oxidizer. In implementations, the tail gas discharged from the third and final catalytic stage is not treated, and wherein the tail gas is incinerated in the thermal oxidizer.

An embodiment is a method of operating an SRU, including feeding acid gas having hydrogen sulfide to a reaction furnace of the SRU. The SRU has a thermal stage having the reaction furnace and a catalytic section having catalytic stages consisting of only three catalytic stages. The method includes converting hydrogen sulfide into elemental sulfur (and recovering the elemental sulfur) via the reaction furnace and the catalytic stages. The catalytic stages include catalytic reactors consisting of a first catalytic reactor, a second catalytic reactor, and a third catalytic reactor disposed operationally in series. The catalyst in the first catalytic reactor consists of alumina catalyst, and the catalyst in the second catalytic reactor consists of a first layer of alumina catalyst, a second layer of hydrogenation catalyst, and a third layer of titania catalyst. In implementations, the first layer of alumina catalyst is at an inlet portion of the second catalytic reactor, the third layer of titania catalyst is at an outlet portion of the second catalytic reactor, and the second layer of hydrogenation catalyst is disposed between the first layer of alumina catalyst and the third layer of titania catalyst. The method can include converting COS and $CS_2$ into hydrogen sulfide via the titania catalyst in the second catalytic reactor.

In implementations, the first catalytic reactor receives furnace gas from the reaction furnace without elemental sulfur condensed and removed from the furnace gas via a condenser heat exchanger of the thermal stage, wherein a catalytic reactor is not operationally disposed between the reaction furnace and the first catalytic reactor. In implementations, the second catalytic reactor receives feed directly from a first catalytic stage of the three catalytic stages, wherein a catalytic reactor is not operationally disposed between the first catalytic reactor and the second catalytic reactor. In implementations, the method includes discharging a process stream having hydrogen sulfide from a third and final catalytic stage of the three catalytic stages as tail gas of the SRU to a thermal oxidizer. In implementations, the tail gas discharged from the third and final catalytic stage is not treated, and wherein the tail gas is incinerated in the thermal oxidizer.

Another embodiment is a method of operating an SRU including feeding acid gas having hydrogen sulfide to a reaction furnace of the SRU. The SRU has a thermal section having the reaction furnace and a catalytic section having catalytic reactors consisting of a first catalytic reactor, a second catalytic reactor, and a third catalytic reactor operationally disposed in series. The method includes converting, via the SRU, the hydrogen sulfide into elemental sulfur and recovering the elemental sulfur, wherein the hydrogen sulfide is converted into elemental sulfur in both the reaction furnace and the catalytic section. The thermal section discharges hydrogen sulfide and sulfur dioxide to the catalytic section. In implementations, the first catalytic reactor receives directly the hydrogen sulfide and sulfur dioxide discharged from the thermal section, wherein a catalytic reactor is not operationally disposed between the thermal section and the first catalytic reactor, and wherein the thermal section does not have a catalytic reactor. In implementations, the first catalytic reactor is disposed first in operational position of catalytic reactors in the SRU.

The catalyst in the first catalytic reactor consists of alumina catalyst. The catalyst in the second catalytic reactor consists of a first layer of catalyst that is alumina catalyst, a second layer of catalyst that is hydrogenation catalyst, and a third layer of catalyst that is titania catalyst. In implementations, a catalytic reactor is not operationally disposed between the first catalytic reactor and the second catalytic reactor. In implementations, the second catalytic reactor has the first layer of catalyst that is alumina catalyst disposed at an inlet portion of the second catalytic reactor, wherein the second catalytic reactor has the third layer that is the titania catalyst disposed at an outlet portion of the second catalytic reactor, and wherein the second catalytic reactor has the second layer of catalyst that is the hydrogenation catalyst disposed between the first layer of catalyst and the second layer of catalyst.

In implementations, the method includes converting COS and $CS_2$ into hydrogen sulfide via the titania catalyst in the second catalytic reactor. In implementations, the method includes discharging a process stream including hydrogen sulfide from a catalytic stage having the third catalytic reactor as tail gas of the SRU to a thermal oxidizer for incineration of the tail gas in the thermal oxidizer. In implementations, the SRU is a Claus system having [1] the thermal section including the reaction furnace and [2] the catalytic section having the catalytic reactors.

Yet another embodiment is an SRU including a thermal section having a reaction furnace to receive feed including hydrogen sulfide and perform an oxidation reaction that converts hydrogen sulfide into sulfur dioxide and a Claus reaction that converts hydrogen sulfide and sulfur dioxide into elemental sulfur. The SRU includes a catalytic section to receive hydrogen sulfide and sulfur dioxide from the thermal section and perform the Claus reaction, wherein the catalytic section has catalytic stages consisting of a first catalytic stage, a second catalytic stage, and a third catalytic stage disposed operationally in series. The first catalytic stage includes a first catalytic reactor to directly receive the hydrogen sulfide and sulfur dioxide from the thermal section.

The catalyst in the first catalytic reactor consists of alumina catalyst, and in which the first catalytic reactor is configured to perform the Claus reaction via the alumina catalyst. The second catalytic stage includes a second catalytic reactor. The catalyst in the second catalytic reactor consists of a first layer of alumina catalyst, a second layer of hydrogenation catalyst, and a third layer of titania catalyst disposed operationally in series. In implementations, the second catalytic reactor has the first layer of alumina catalyst disposed at an inlet portion of the second catalytic reactor, wherein the second catalytic reactor has the third layer of titania catalyst disposed at an outlet portion of the second catalytic reactor, and wherein the second catalytic reactor has the second layer of hydrogenation catalyst disposed between the first layer of alumina catalyst and the third layer of titania catalyst.

In implementations, the second catalytic reactor is configured to convert COS and $CS_2$ into hydrogen sulfide via the titania catalyst. In implementations, a catalytic reactor is not operationally disposed between the thermal section and the first catalytic reactor, wherein the thermal section does not include a catalytic reactor. In implementations, the first catalytic reactor is a catalytic reactor that is disposed first in operational position of catalytic reactors in the SRU, wherein a catalytic reactor is not operationally disposed between the first catalytic reactor and the second catalytic reactor.

In implementations, the thermal section, the first catalytic stage, the second catalytic stage, and the third catalytic stage each have a condenser heat exchanger to condense elemental sulfur and discharge the elemental sulfur to a sulfur pit. In implementations, the SRU includes a thermal oxidizer to receive tail gas of the SRU including hydrogen sulfide from the third catalytic stage to incinerate the hydrogen sulfide into sulfur dioxide. In implementations, the SRU is a Claus system having the thermal section and the catalytic section.

A number of implementations have been described. Nevertheless, it will be understood that various modifications may be made without departing from the spirit and scope of the disclosure.

What is claimed is:

1. A sulfur recovery unit (SRU) comprising:

a thermal section comprising:

a reaction furnace configured to receive a feed comprising hydrogen sulfide and perform an oxidation reaction that converts hydrogen sulfide into sulfur dioxide and a first Claus reaction that converts hydrogen sulfide and sulfur dioxide into elemental sulfur; and a catalytic section configured to receive hydrogen sulfide and sulfur dioxide from the thermal section and perform a second Claus reaction that converts hydrogen sulfide and sulfur dioxide into elemental sulfur, the catalytic section comprising:

a first catalytic stage comprising a first catalytic reactor configured to directly receive the hydrogen sulfide and sulfur dioxide from the thermal section;

wherein the first catalytic reactor comprises a first catalytic reactor catalyst consisting of a first alumina catalyst; and wherein the first catalytic reactor is configured to perform the second Claus reaction via the first alumina catalyst;

a second catalytic stage comprising a second catalytic reactor;

wherein the second catalytic reactor comprises a first catalyst layer comprising a second alumina catalyst, a second catalyst layer comprising a hydrogenation catalyst, and a third catalyst layer comprising a titania catalyst;

wherein the first catalyst layer is disposed on the second catalyst layer; and wherein the second catalyst layer is disposed on the third catalyst layer; and a third catalytic stage;

wherein the first catalytic stage, the second catalytic stage, and the third catalytic stage are disposed operationally in series.

2. The SRU of claim 1, further comprising a thermal oxidizer to receive tail gas of the SRU comprising hydrogen sulfide from the third catalytic stage to incinerate the hydrogen sulfide into sulfur dioxide.

3. The SRU of claim 1;

wherein a catalytic reactor is not operationally disposed between the thermal section and the first catalytic reactor; and wherein the thermal section does not comprise a catalytic reactor.

4. The SRU of claim 1:

wherein the second catalytic reactor is configured to convert carbonyl sulfide (COS) and carbon disulfide ($CS_2$) into hydrogen sulfide via the third catalyst layer;

wherein the first catalytic reactor is a catalytic reactor that is disposed first in operational position of catalytic reactors in the SRU; and wherein a catalytic reactor is not operationally disposed between the first catalytic reactor and the second catalytic reactor.

5. The SRU of claim 1:

wherein the first catalyst layer is disposed at an inlet portion of the second catalytic reactor;

wherein the second catalytic reactor has the third catalyst layer disposed at an outlet portion of the second catalytic reactor; and wherein the second catalytic reactor has the second catalyst layer disposed between the first catalyst layer and the third catalyst layer.

6. The sulfur recovery unit of claim 1, wherein the third catalytic stage comprises a third catalytic reactor.

7. A sulfur recovery unit (SRU) comprising:

a thermal section comprising:

a reaction furnace configured to receive a feed comprising hydrogen sulfide and perform an oxidation reaction that converts hydrogen sulfide into sulfur dioxide and a first Claus reaction that converts hydrogen sulfide and sulfur dioxide into elemental sulfur; and a catalytic section configured to receive hydrogen sulfide and sulfur dioxide from the thermal section and perform a second Claus reaction that converts hydrogen sulfide and sulfur dioxide into elemental sulfur, the catalytic section comprising:

a first catalytic stage comprising a first catalytic reactor configured to directly receive the hydrogen sulfide and sulfur dioxide from the thermal section;

wherein the first catalytic reactor comprises a first catalytic reactor catalyst consisting of a first alumina catalyst; and wherein the first catalytic reactor is configured to perform the second Claus reaction via the first alumina catalyst;

a second catalytic stage comprising a second catalytic reactor;

wherein the second catalytic reactor comprises a first catalyst layer comprising a second alumina catalyst, a second catalyst layer comprising a hydrogenation catalyst, and a third catalyst layer comprising a titania catalyst;

wherein the first catalyst layer is disposed on the second catalyst layer; and wherein the second catalyst layer is disposed on the third catalyst layer; and a third catalytic stage;

wherein the first catalytic stage, the second catalytic stage, and the third catalytic stage are disposed operationally in series; and wherein each of the thermal section, the first catalytic stage, the second catalytic stage, and the third catalytic stage respectively comprises a respective condenser heat exchanger to condense respective elemental sulfur and discharge the respective elemental sulfur to a sulfur pit.

* * * * *